Sept. 24, 1935.  O. J. McCULLOUGH  2,015,277
INSIDE CASING CUTTER
Filed Oct. 30, 1933  3 Sheets-Sheet 3

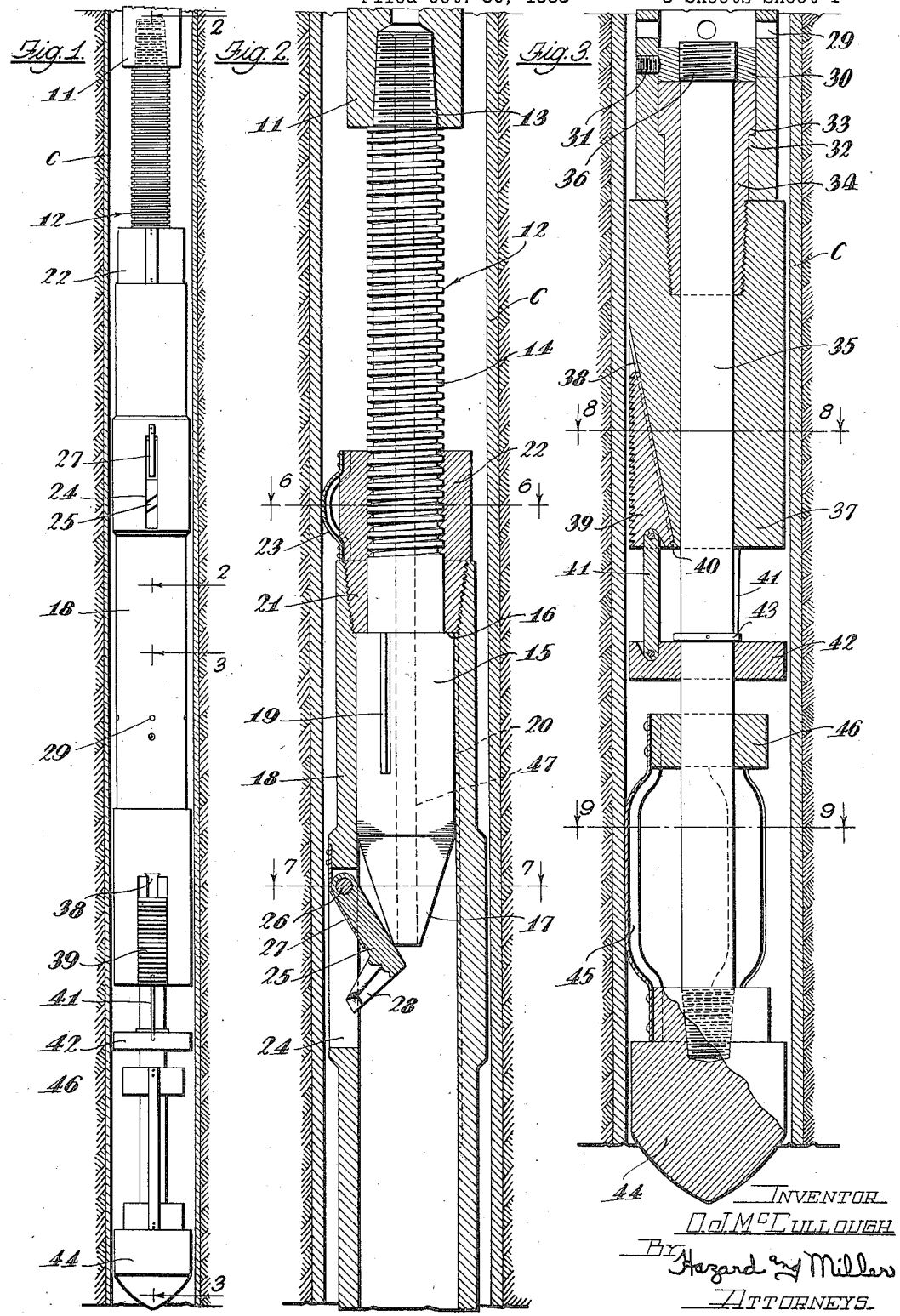

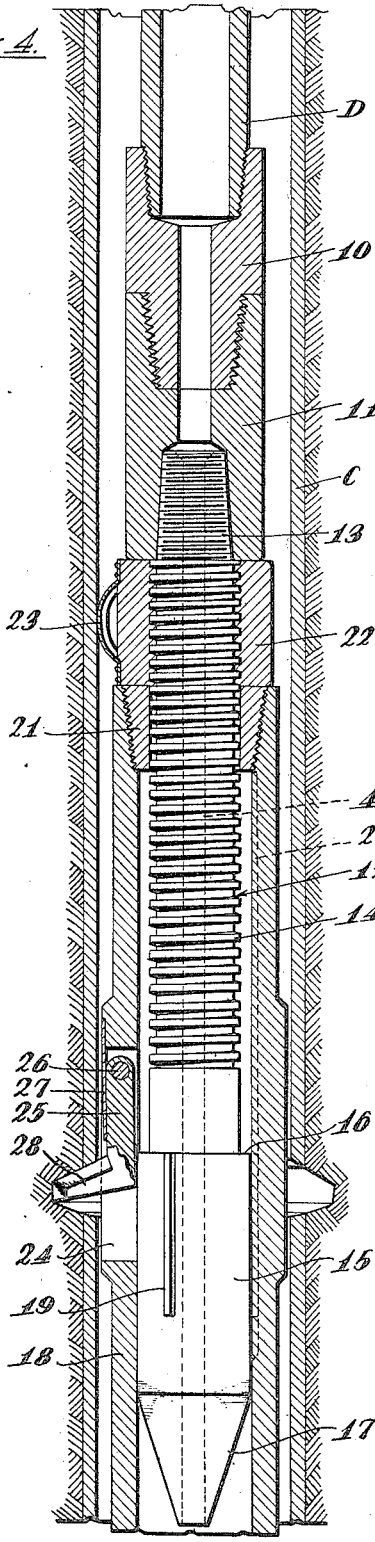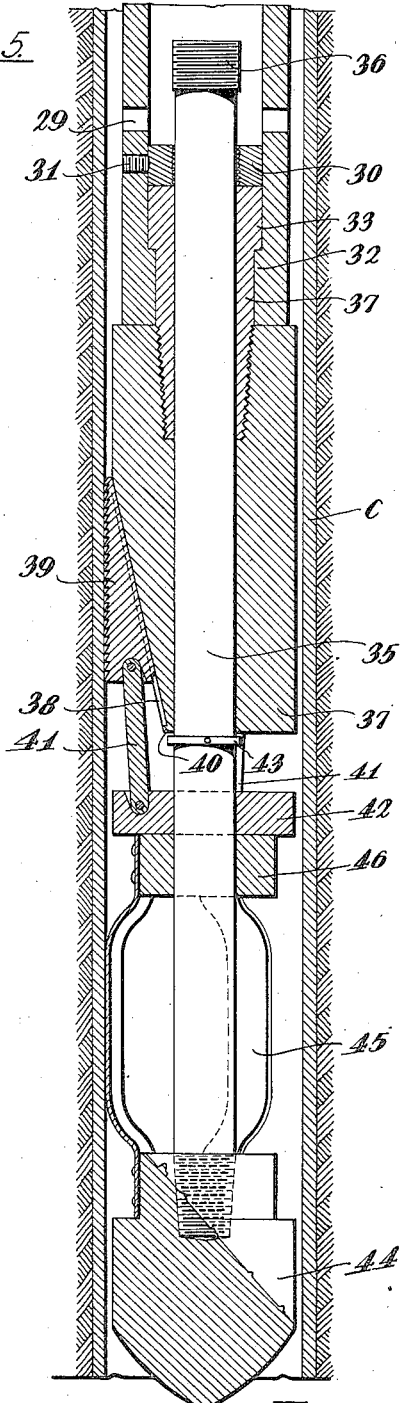

INVENTOR
O. J. McCULLOUGH
By Hazard and Miller
ATTORNEYS

Patented Sept. 24, 1935

2,015,277

UNITED STATES PATENT OFFICE 2,015,277

INSIDE CASING CUTTER

Otis J. McCullough, Huntington Park, Calif.

Application October 30, 1933, Serial No. 695,836

5 Claims. (Cl. 81—195)

My invention relates to improvements in casing cutters designed to cut casings in wells.

An object of the present invention is to provide an improved casing cutter designed to be used with a rotary drilling apparatus which will be capable of being easily set in a casing in a well and caused to easily and completely cut the casing. In prior casing cutters the arrangement of parts frequently is such that when the casing cutter has been set and the body of the cutter is rotated during the cutting action there is a downward movement of the cutting means during the rotation. This causes the cutter to, in effect, make a spiral or helical cut as distinguished from a perfectly horizontal cut.

In the present construction, when the casing cutter has been set the cutters are thereafter expanded and caused to cut in a horizontal plane.

One of the greatest difficulties with prior casing cutters is to ascertain when the cut has been completed or, in other words, when the casing has been completely cut through. An important object of the present invention is to provide an improved casing cutter which will give a very apparent indication that the cutting means on the casing cutter has been completely expanded and the casing has been completely cut through.

Another object of the invention is to provide a casing cutter of simple and durable construction, the parts of which can be easily manufactured and assembled.

With the foregoing and other objects in view, which will be made manifest in the following detailed description, and specifically pointed out in the appended claims, reference is had to the accompanying drawings for an illustrative embodiment of the invention, wherein:

Fig. 1 is a vertical section through a well casing in a well, illustrating the improved casing cutter in side elevation therein.

Fig. 2 is a diametrical section through the upper portion of the improved casing cutter and may be considered as having been taken substantially upon the line 2—2 of Fig. 1.

Fig. 3 is a diametrical section of the lower portion of the casing cutter and may be considered as having been taken upon the line 3—3 upon Fig. 1.

Figs. 4 and 5 are views similar to Figs. 2 and 3, illustrating the position of parts after the cutting means on the casing cutter has been completely expanded and the cut through the casing completed.

Figure 6:
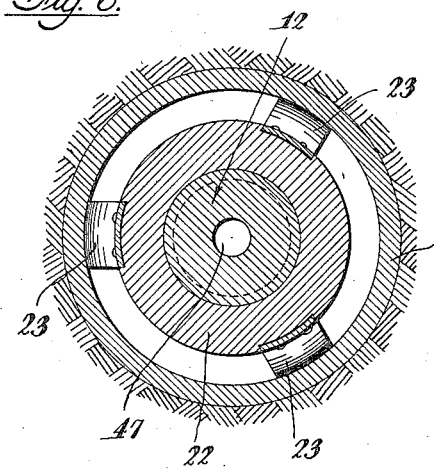
Fig. 6 is a horizontal section taken substantially upon the line 6—6 of Fig. 2.
Figure 7:
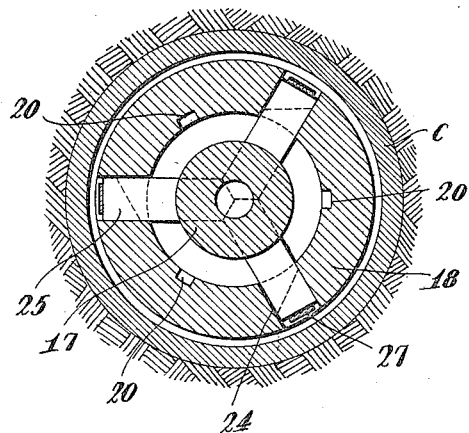
Fig. 7 is a horizontal section taken substantially upon the line 7—7 upon Fig. 2.
Figure 8:
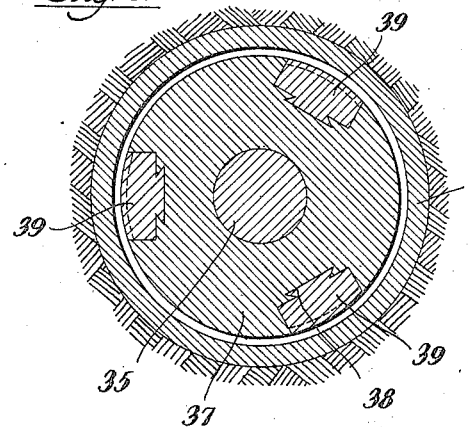
Fig. 8 is a horizontal section taken substantially upon the line 8—8 upon Fig 3.
Figure 9:
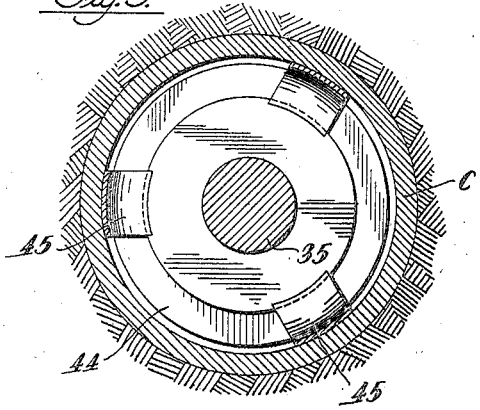
Fig. 9 is a horizontal section taken substantially upon the line 9—9 upon Fig. 3.

Referring to the accompanying drawings, wherein similar reference characters designate similar parts throughout, the reference character C designates the well casing which it is desired to cut by means of the improved casing cutter. The reference character D designates the conventional drill pipe which is used to lower the improved casing cutter into the well through casing C. On the lower end of the drill pipe there is disposed a tool joint, the parts of which are indicated at 10 and 11.

The casing cutter consists of a mandrel 12 having its upper end threaded as indicated at 13, providing for attachment to the tool joint. Below the extreme upper end of the mandrel there is a relatively long externally threaded portion 14. The mandrel has its lower end enlarged, as indicated at 15, forming a shoulder 16 and below the enlarged portion 15, which is a general cylindrical form, there is a tapered portion 17. The mandrel extends into a tubular body 18 and is slidably keyed to the body by splines or feathers 19, which are slidable in grooves 20 formed on the interior of the body. The upper end of the body is closed by a closure 21 which is screwed into the top of the body and which is engageable with shoulder 16 to maintain the mandrel in the body. A nut 22 is threaded on to threaded portion 14 of the mandrel and carries several friction springs 23 which are engageable with the interior casing C.

One or more apertures 24 are formed in the walls of the body and are arranged near the bottom of the mandrel when the mandrel is in its uppermost position. The number of these apertures may vary but there are preferably three. Each aperture is designed to receive a cutter, one of the cutters, indicated at 25, being of somewhat L shape. The cutters are pivoted upon pivot pins 26 and are urged into their innermost positions by means of leaf springs 27 fastened to the body over the apertures and engaging the shanks of the cutters so as to swing them inwardly into the position shown in Fig. 2.

The arms of the cutters, indicated at 28, preferably form an angle of greater than ninety degrees with the shanks so that when the cutters are fully expanded, as shown in Fig. 4, they will be downwardly and outwardly inclined instead of perfectly horizontal.

The backs of the cutters are engageable with the lower end of mandrel 12 and the cutters are expanded or moved into their outer positions by lowering the mandrel with respect to the body.

Near the bottom of the body, a plurality of apertures 29 are formed, providing for egress of cuttings and for circulation fluid. Immediately below these apertures a nut 30 is secured within the body, such as by set screws 31. The bottom of the body is internally shouldered, as indicated at 32, for engagement with the shoulder 33 on a thimble 34. A stem 35 extends upwardly through the thimble and has its upper end enlarged and threaded, as indicated at 36. The purpose of having the upper end enlarged is to enable the small or cylindrical portion of the stem to slide through nut 30. The lower end of thimble 34 is threaded into a slip carrying member 37 which is provided with dove-tailed grooves 38 constituting slip ways for slidable slips 39. The number of slip ways and slips may vary although three are preferable. The lower ends of the slip ways are provided with stops 40 which limit the downward movement of the slips therein. Each slip has a link 41 pivotally connected thereto and these links are, in turn, pivotally connected to a collar 42 which surrounds stem 35. A collar 43 also surrounds stem 35 and is secured thereto, as by set screws. The collar 43 may be engaged by collar 42. On the bottom of the stem there is secured a head or bull plug 44 which carries a series of friction springs 45. The number of these friction springs may vary but three are preferable, and these friction springs are engageable with the interior of casing C. Their upper ends are secured to a collar 46 surrounding stem 35.

The operation and advantages of the improved casing cutter are as follows:

When it is desired to cut casing C, the parts of the casing cutter are positioned in the positions shown in Figs. 2 and 3, wherein the cutters are contracted, the mandrel is in its uppermost position, and the slips 39 are in their lowermost positions. The device is then lowered into the casing by means of the drill pipe D until it reaches the level at which it is desired to cut the casing. During the downward movement friction springs 23 and 45 merely slide on the interior of the casing. When the proper level has been reached, the drill pipe is rotated. This causes mandrel 12 to rotate and body 18 to be rotated thereby because of the splined connection with the mandrel. The friction springs 23 frictionally engaging the casing C hold nut 22 stationary or against rotation during rotation of the mandrel 12. Friction springs 45 hold stem 35 against rotation, and the slip carrying member 37 with thimble 34 will also remain stationary while the body rotates against shoulder 33.

During the rotation of the mandrel and the body the nut 22 is screwed upwardly on the threaded portion 14 of the mandrel so as to release the mandrel and render it available for downwardly sliding movement through the body. At the same time that nut 22 is screwing upwardly on the mandrel the upper threaded end 36 on stem 35 is caused to screw upwardly through nut 30, it being understood that nut 30 turns with the body. This upward screwing of stem 35 through nut 30 causes friction springs 45 to slide upwardly a short distance in the casing.

When the upper threaded end 36 on stem 35 has been completely screwed out of nut 30 the nut may then slide downwardly over the small cylindrical portion of the stem. When the body has been given sufficient turns to completely screw the threaded end 36 through the nut, rotation of the drill pipe is stopped and the drill pipe and tool are then lowered. This lowers the slip carrying member 37, the slips 39, and collar 42 until collar 42 engages collar 46 which will be held stationary in the well during this lowering movement of the drill pipe by friction springs 45. When collar 42 engages 46 its downward movement is arrested and further downward movement of the slip carrying member is effective to expand slips 39 into engagement with the interior of the casing, as shown in Fig. 5.

When the tool has thus been set in the casing it is in condition to start cutting operations. The drill pipe is lowered further and rotation is resumed. This continued lowering of the drill pipe causes mandrel 12 to slide downwardly through the body and rotation of the mandrel produces rotation of the body. The downward movement of the mandrel causes the tapered lower end, which presents inclined surfaces, to engage the backs of the cutters, gradually expanding them into engagement with the casing. During this expansion and rotation the cutters are gradually forced outwardly into the casing, causing the casing to be cut through.

As previously stated, an object of the invention is to give a definite indication when a cut has been completed. To this end, the length of the cylindrical portion 15 on mandrel 12 is quite long, preferably being in the neighborhood of at least a foot in length. This presents a vertical surface engageable with the backs of the cutters, providing a "drop away". In other words, when the cutters have been expanded into their outermost positions, which will be accomplished when the mandrel is lowered to a point where the top of the tapered lower end of the mandrel engages the back of the cutters. It is possible thereafter to continue to lower the drill pipe for approximately one foot without expanding the cutters further. In this way the operator is given a positive indication that his cut has been completed, namely, by noticing the fact that he has been able to lower this drill pipe for approximately one foot without encountering any resistance to rotation which would be involved if the cutters were still being expanded by the downward movement of the mandrel. The ability to lower the drill pipe this distance without encountering any resistance to rotation thus indicates to the driller that his cutters on the casing cutter have been completely expanded and the casing has been cut through. When the casing has been cut through the tool is merely withdrawn by an upward pull on the drill pipe. The first upward movement is effective to lift the mandrel into its uppermost position, after which the leaf springs 27 may be capable of swinging the cutters back into the positions shown in Fig. 2. Continued upward pulling causes the mandrel to lift the body which lifts the slip carrying member 27 and the slips 39 to slide downwardly in the slip ways into their contracted positions. The stem 35 is withdrawn from the casing through the enlarged upper end, which is threaded at 36, engaging nut 30.

In the event that one or more cutters have become stuck so that the leaf springs 37 are incapable of retracting them, upward movement of the body causes the cutters to be forcibly retracted by virtue of the fact that their arms are downwardly and outwardly inclined. The purpose of nut 22 is merely to lock the mandrel in its uppermost position while the tool is being lowered into the well.

In the preferred form of construction the mandrel 12 is hollow, having a bore 47 therein for the passage of circulation fluid, which washes the cuttings away from the cut. The circulation fluid in the body may escape therefrom through outlet ports 29 as well as apertures 24 through which the cutters extend.

From the above described construction it will be appreciated that it is possible to lower the casing cutter into a casing to any desired depth. The slips 39 are then set and as the body rotates on the set slip carrying member 37 the cutters are always carried in a horizontal plane. The cutters are then expanded to make the cut in the casing and a positive indication is given to the driller when the cutters have been completely expanded and the cut has been completed by his ability to lower the drill pipe for a considerable distance without encountering any rotational resistance.

Various changes may be made in the details of construction without departing from the spirit or scope of the invention as defined by the appended claims.

I claim:

1. A casing cutter comprising a body, a mandrel slidably keyed in the body, a stem extending downwardly from the body and detachably connected thereto so that upon detachment the body may be lowered relatively to the stem, means engageable with the casing for holding the stem stationary for purposes of detachment, means providing slip ways rotatable relatively to the body, slips in the slip ways, means on the stem operable to effect expansion of the slips when the body and slip way providing means are lowered relatively thereto, and cutting means on the body engageable by the mandrel adapted to be expanded thereby, said mandrel presenting inclined and vertical surfaces both of which are engageable with the cutting means, said mandrel having a threaded portion projecting upwardly from the body, a nut threaded on to said threaded portion, and means on the nut for frictionally engaging the casing.

2. An inside casing cutter comprising a cutter body, cutting means mounted for expanding movement upon the body, a mandrel slidably keyed within thhe cutter body presenting surfaces engageable with the cutting means to expand the cutting means, said mandrel having a threaded portion extending through the top of the cutter body, a nut threaded thereon, friction springs on the nut engageable with the interior of a casing, and means for attaching the mandrel to a drill pipe.

3. An inside casing cutter comprising a cutter body, cutting means mounted for expanding movement upon the body, a mandrel slidably keyed within the cutter body presenting surfaces engageable with the cutting means to expand the cutting means, said mandrel having a threaded portion extending through the top of the cutter body, a nut threaded thereon, friction springs on the nut engageable with the interior of a casing, means for attaching the mandrel to a drill pipe, and means disposed below the cutter body engageable with the interior of the casing for seating the cutter body therein.

4. An inside casing cutter comprising a cutter body, cutting means mounted for expanding movement upon the body, a mandrel slidably keyed within the cutter body presenting surfaces engageable with the cutting means to expand the cuting means, said mandrel having a threaded portion extending through the top of the cutter body, a nut threaded thereon, friction springs on the nut engageable with the interior of a casing, and means for attaching the mandrel to a drill pipe, said cutting means-engaging surfaces being vertical and downwardly and inwardly inclined, with the vertical surfaces extending upwardly from the top of the inclined surfaces whereby the mandrel may be lowered in the cutter body while the cutting means is fully expanded without producing further expansion of the cutting means to indicate a completed cut.

5. An inside casing cutter comprising a cutter body, cutting means mounted for expanding movement upon the body, a mandrel slidably keyed within the cutter body presenting surfaces engageable with the cutting means to expand the cutting means, said mandrel having a threaded portion extending through the top of the cutter body, a nut threaded thereon, friction springs on the nut engageable with the interior of a casing, means for attaching the mandrel to a drill pipe, means disposed below the cutter body engageable with the interior of the casing for seating the cutter body therein comprising a slip carrying member rotatably connected to the bottom of the cutter body, slips slidably mounted thereon, a stem slidable therethrough, a nut on the cutter body threaded onto the stem, friction springs on the stem engageable with the interior of the casing, and means associated with the stem for holding the slips contracted until the nut releases the stem upon rotation of the cutter body by the mandrel.

OTIS J. McCULLOUGH.